Nov. 1, 1960   D. P. ROGERS ET AL   2,958,822
LOW FREQUENCY SPECTRUM AND AMPLITUDE DISTRIBUTION ANALYZER
Filed April 26, 1956   2 Sheets-Sheet 1

INVENTORS
DONALD P. ROGERS
DONAL B. STAAKE
BY
ATTORNEYS

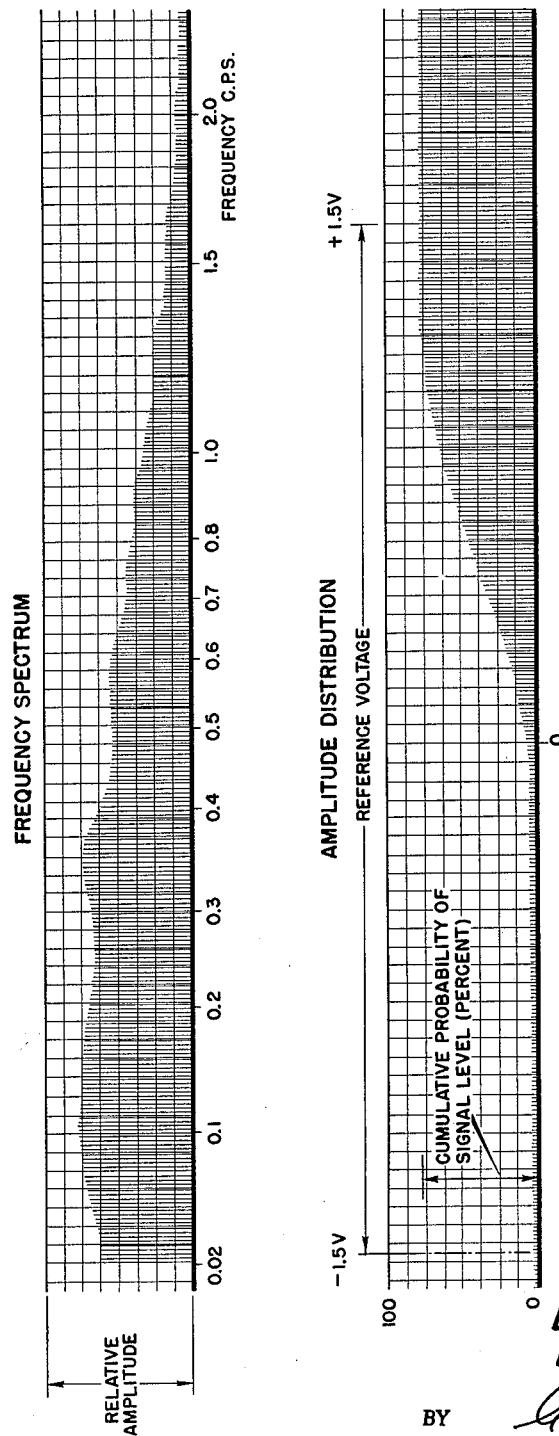
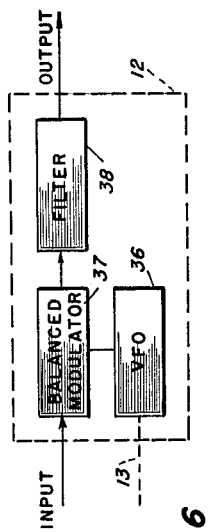
FIG. 4.
FIG. 5.
FIG. 6.
INVENTORS
DONALD P. ROGERS
DONAL B. STAAKE
BY
ATTORNEYS

# United States Patent Office 2,958,822
Patented Nov. 1, 1960

2,958,822

LOW FREQUENCY SPECTRUM AND AMPLITUDE DISTRIBUTION ANALYZER

Donald P. Rogers, Kensington, and Donal B. Staake, Silver Spring, Md., assignors to the United States of America as represented by the Secretary of the Navy Filed Apr. 26, 1956, Ser. No. 580,967

1 Claim. (Cl. 324—77)

The present invention relates to the apparatus and method for analyzing a low frequency signal. More specifically, the invention relates to a means and method for providing a chart which indicates the amplitude and frequency distribution of the various components of a complex electrical wave.

The desirability of possessing a frequency spectrum of a complex signal is well established. Very briefly, a spectrum analysis is of great value in determining design parameters for the construction of communications equipment, in choosing the frequency of a signal which may be interspersed with the complex signal without interfering with the information conveyed by the complex signal, and in contributing to the general understanding of the causes which give rise to the signal. By way of example, a spectrum analysis of the speaking voice has indicated the minimum bandwidth necessary to establish comprehensible transmission of speech. Thus, considering that components having extended frequency range are more costly and complex than those having more limited characteristics, a telephone transmission circuit can be designed which reasonably balances cost with characteristics to provide the most efficient service.

Heretofore, however, spectrum analyzers have been confined to approximately 20 c.p.s. as their lower limit of operation. There is a vast and unexplored domain of frequencies extending much below 20 c.p.s. which cannot be analyzed on conventional equipment. For instance, there is the tidal movement of the sea complicated by winds which produce oscillations ranging from .04 to 5 c.p.s. Certain noise phenomena occurring in vacuum tubes have a similar range of frequencies.

It is therefore an important object of the present invention to provide a spectrum analyzer capable of operation within the range of 0 to 5 c.p.s.

Another object of the present invention is the provision of a method for analyzing complex low frequency waves which will permit the utilization of conventional apparatus.

An additional object of the present invention resides in the provision of an amplitude distribution analyzer operating simultaneously with the spectrum analyzer.

A further object of the present invention is to provide a spectrum and amplitude distribution analyzer which presents the results of its operation in chart form.

Briefly, the present invention includes a playback unit through which is fed a loop of magnetic recording tape. The signal on the loop is composed of a number of re-recordings of the original signal, each recording having increased the frequencies of the components of the complex wave. The final recording produces a signal having components which are similar in amplitude to the original signal but whose frequencies have been multiplied by a fixed number related to recording and playback speed. The frequency multiplication obtained in such a manner enables the use of conventional wave analyzing equipment operating within the range of 20 to 20,000 c.p.s.

In the drawings:

Fig. 4 is an example of a typical low frequency spectrum produced by the present invention;

Fig. 5 is an example of an amplitude distribution curve produced by the present invention; and Fig. 6 is a block diagram of the harmonic wave analyzer employed in the present invention.

Figure 1:
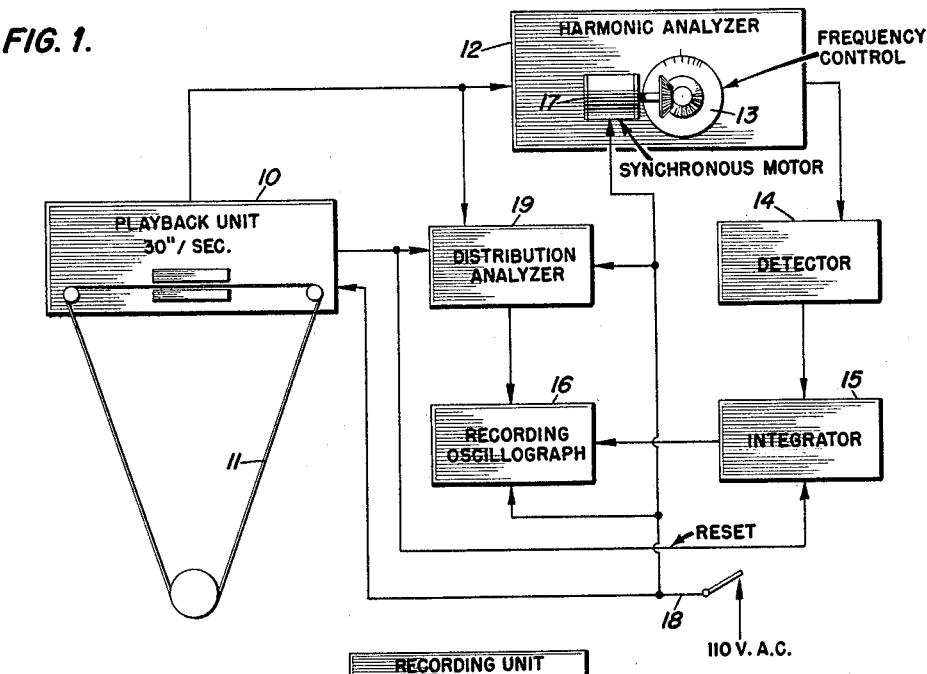
Fig. 1 is a functional block diagram of the apparatus of the present invention.

In the functional block diagram of Fig. 1, the magnetic tape playback unit 10 includes a tape transport mechanism and a pick-up head for reproducing the signal impressed upon a tape loop 11. The output signal of the playback unit 10 is similar to the original complex wave except that the frequencies of the components have been multiplied by a process more fully described hereinafter.

The output of the playback unit 10 is analyzed by a wave analyzer 12 which conventionally includes, as illustrated in Fig. 6, a variable frequency oscillator 36, and a balanced modulator 37 which combines the tape output signal with the oscillator signal to produce several sidebands. From amongst the sidebands there is selected, by means of a filter, the sideband centered at 20,000 c.p.s. The amplitude of the 20,000 c.p.s. sideband corresponds to the amplitude of that component of the input signal which has a frequency equal to the calibrated frequency of the variable oscillator 36. By altering the position of the frequency control 13 and hence the frequency of the oscillator, the relative amplitude of all the components which constitute the input signal can be determined. A complete description of wave analyzer apparatus and operation is contained in the publication, "The General Radio Experimenter," for December 1938.

The 20,000 c.p.s. output signal is rectified in a detector 14 and integrated by a Miller-type integrator 15, to provide the average value of one of the components of the tape signal during one cycle of the tape loop 11. The integrator 15 includes a conventional reset relay (not shown) for shorting or discharging the integrator output. A continuous record of the integrator output is provided by the recording oscillograph 16.

A synchronous motor drive mechanism continuously varies the frequency control 13 of wave analyzer 12 at a constant rate thereby establishing the wave analyzer output as a function of time. The paper drive of the oscillograph 16 and the drive mechanism of the magnetic tape playback unit 10 are also powered by synchronous motors, energized simultaneously through a power circuit 18 thus synchronizing operation and enabling the entire analysis to be automatically performed.

The method of preparation of the original data for analysis is as follows. The original signal is measured by a suitable transducer to provide an electrical signal corresponding to the physical phenomenon being observed. The output of the transducer is recorded upon magnetic tape, the period of recording being of sufficient duration to capture a suitable number of cycles of the lowest interesting frequency component of the phenomenon. The recordation of a number of cycles permits reasonable average values to be determined and thereby prevents a component having a momentarily extraordinary amplitude from distorting the results. For instance, assume that a signal having as its lowest component a frequency of .04 c.p.s. is to be analyzed. An acceptable sample of the signal should preferably include 10 cycles of the lowest frequency present, therefore a recording of approximately 4 minutes duration is required.

Figure 2:
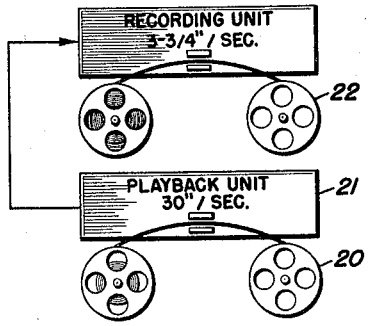
Fig. 2 is a block diagram of the recording and playback apparatus employed in the preparation of data for analysis.

The original sample of the signal is recorded upon a magnetic tape moving at a low rate, say 3¾ inches per second. Approximately 70 feet of tape will be consumed in the first recording. The first recording 20 (Fig. 2) is inserted in a playback mechanism 21 (Fig. 2) running at a high rate, say 30 inches per second, which is 8 times greater than the recording speed. The output of the first tape is re-recorded upon a second tape 22 again travelling at the low rate of 3¾ inches per second. It is evident that the process of re-recording requires only about ½ minute to complete, and therefore the second tape 22 is only ⅛ as long as the original tape. It is important to note also that the lowest frequency present on the second tape is 8 times as great as the lowest frequency on the original tape, and that if the second tape 22 be substituted for tape 20 and re-recorded onto a third tape by a similar process, the lowest frequency present on the third tape will be 64 times as great as the lowest frequency on the original tape.

The foregoing process permits the multiplication of low frequency signals to provide higher frequency signals which can be accepted by conventional analyzing equipment. Therefore, in the case of a component having a frequency of .04 c.p.s., two re-recordings and final playback at 8 times the original record speed shift the frequencies upward by 512 to the point where the lowest frequency present is equal approximately to 20.5 c.p.s.

The final tape is formed into the loop 11 which is continuously circulated by the playback unit 10 during the course of analysis. At the commencement of the analysis, the wave analyzer 12 is set at its lowest frequency (zero c.p.s.). The integrators are then unshorted and the wave analyzer drive 17, and recorder 16 simultaneously set into motion by energizing the common power circuit 18, thus commencing the analysis.

The wave analyzer drive 17 is sufficiently slow that a statistically adequate number of complete revolutions of the tape loop 11 can be accomplished before the drive 17 has advanced the analyzer frequency by an amount equal to the band width of its internal filter. That is, assuming the band width of the wave analyzer filter to be 30 cycles, then the analyzer drive 17 should not advance the analyzer beyond 50 c.p.s., the initial setting of the analyzer being 20 c.p.c., prior to the completion of 8 or more tape revolutions.

The wave analyzer frequency setting is altered at a sufficiently slow rate that it may be assumed fixed during one revolution of the tape loop 11. At the conclusion of one tape revolution, the analyzer may be assumed to have a slightly higher fixed frequency during the second tape revolution, and so forth. During one tape revolution the instantaneous value of one particular component may not be constant since the original data may not have constituted an exactly periodic function. Therefore, the average value of a particular component is obtained by integrating the output of the wave analyzer. At the end of each tape revolution the integrator is discharged, by means of a relay actuated by a synchronization signal recorded by an unused channel on the magnetic tape. During succeeding tape revolutions, the integrator acquires new values, each new value representing the amplitude of a component of the signal having frequency higher than the preceding value.

Figure 3:
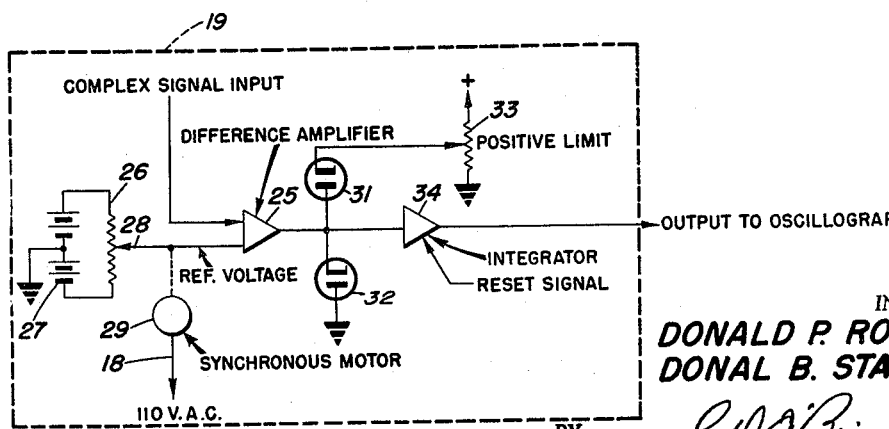
Fig. 3 is a simplified schematic of the apparatus for determining the amplitude distribution of a complex wave.

In Fig. 1, an amplitude distribution analyzer is shown generally at 19. Fig. 3 illustrates the distribution analyzer in greater detail. The output signal of tape 11 is fed directly to a difference amplifier 25 in which the difference between the amplitude of the complex signal and a slowly varying linear reference voltage is obtained.. The reference voltage is derived from a potentiometer 26 energized by a battery 27. The arm 28 of potentiometer 26 is driven by a synchronous motor 29 energized from the power circuit 18. The difference between the complex signal and the reference voltage is highly amplified in amplifier 25 and limited by diodes 31 and 32. Diode 31 limits positive output voltages to the limit established by the voltage divider 33. Diode 32 short circuits negative output voltages. The polarity of the output of amplifier 25 is dependent upon whether the complex signal amplitude is more or less positive than the reference voltage. If the signal amplitude is less positive than the reference voltage a high positive amplifier output appears. Due to positive limiting in diode 31 and high amplificataion in amplifier 25, the voltage at the junction of diodes 31 and 32 is a square wave having a constant amplitude and period depending upon the length of time the complex signal amplitude is less positive than the reference voltage.

The square wave voltage is integrated in a Miller integrator 34, similar to integrator 15, the output of which is recorded as the amplitude distribution curve.

Figs. 4 and 5 are charts typical of the output of the apparatus illustrated in Fig. 1. In Fig. 4 the relative amplitudes of the components of a particular complex wave appears, indicating the major components to be in the low frequency end of the spectrum. In Fig. 5, the amplitude distribution curve, the ordinate units are cumulative probability, in percent, that the signal level will be below a particular value of reference voltage. From a curve such as Fig. 5, the mean value and the R.M.S. value of the complex wave can be determined.

The spikes appearing in Figs. 4 and 5 are formed by the discharge of the integrators at the end of each complete tape revolution. As the integrator reset signal occurs just prior to the appearance in the playback unit of the splice joining the ends of the tape loop 11, the transient which would normally be introduced by the splice is masked and cannot distort the results of the analysis.

It is to be noted that the frequency scale or abscissa of the plot illustrated in Fig. 4 is not linear. The non-linearity results from the fact that the frequency of the wave analyzers is not proportional to the rotation of their controls. Therefore, prior to operating the analyzer, it is necessary either to calculate the frequency scale or experimentally to calibrate the chart in terms of frequency.

A simple calibration procedure merely involves inserting known frequencies into the analyzer and noting the chart position at which an output appears. That is, assume that it is desired to locate the 0.1, 0.2, and 0.3 c.p.s. positions on the chart. The analyzer drive motor and chart motor are started simultaneously, the initial setting of the wave analyzer being 20 c.p.s., a signal having a frequency of 51.2 c.p.s. is then supplied to the analyzer. No output from the analyzer will be seen until the motor drive advances the wave analyzer approximately to 51.2 c.p.s. when an analyzer output will be recorded. The input signal is then rapidly shifted to 102.4 c.p.s. No output will appear upon the recording until such time as the analyzer frequency has been advanced to 102.4 c.p.s. by the motor drive. When an output has been obtained from 102.4 c.p.s., the input frequency is shifted to the next desired calibration point. It is to be noted that each calibration frequency is chosen to be higher than the scale affixed to the chart by the amount of frequency multiplication obtained by the process hereinbefore set forth.

Having calibrated the chart in accordance with the foregoing procedure, it is necessary thereafter to maintain the chart speed, analyzer motor drive speed, and frequency multiplication factor at the same values obtaining during calibration to insure the accurate location of the frequency scale upon the chart.

Obviously many modifications and variations of the present invention are possible in the light of the above teachings. It is therefore to be understood that within the scope of the appended claim the invention may be practiced otherwise than as specifically described.

What is claimed is:

An analyzer for determining the amplitude distribution of a complex low frequency wave, comprising means providing a permanent reproducible recording of said complex wave, said recording means providing an electrical output, an oscillograph, means including a battery and a potentiometer for providing a time varying linear reference voltage synchronized with said oscillograph, a difference amplifier for providing the difference between the magnitude of said reference voltage and the amplitude of the output of said recording means, a limiter receiving the output of said difference amplifier, said limiting means including a pair of diodes, one of said diodes being biased to the value of the desired amplitude limit for outputs of one polarity from said difference amplifier, the other of said diodes being grounded to short circuit opposite polarity outputs from said difference amplifier, and an integrator providing the time integral of said limited output, the output of said integrator being applied to said oscillograph to produce a chart indicative of the amplitude distribution of said wave.

References Cited in the file of this patent

UNITED STATES PATENTS

| | | |
|---|---|---|
| 2,530,693 | Green | Nov. 21, 1950 |
| 2,584,866 | Gray | Feb. 5, 1952 |
| 2,673,294 | Battell et al. | Mar. 23, 1954 |
| 2,679,636 | Hillyer | May 25, 1954 |
| 2,752,589 | DeLong | June 26, 1956 |
| 2,779,869 | Gerks | Jan. 29, 1957 |
| 2,779,872 | Patterson | Jan. 29, 1957 |
| 2,794,954 | Bischoff | June 4, 1957 |
| 2,807,798 | Dunnington | Sept. 24, 1957 |
| 2,849,183 | Kuck | Aug. 26, 1958 |
| 2,858,438 | Merrill | Oct. 28, 1958 |
| 2,889,503 | Chambers | June 2, 1959 |

OTHER REFERENCES

The Journal of the Acoustical Society of America, vol. 1, No. 5. September 1949, article by Mathes et al., pp. 527–537.